United States Patent [19]

Shiga et al.

[11] Patent Number: 5,209,519
[45] Date of Patent: May 11, 1993

[54] VEHICLE OCCUPANT PROTECTION AIR BAG MODULE

[75] Inventors: Masayuki Shiga; Kanichi Fukuda; Kazuhiro Seki; Yukio Hiruta; Masanori Takagawa, all of Wako, Japan

[73] Assignee: Honda Giken Kogyo Kabushiki Kaisha, Tokyo, Japan

[21] Appl. No.: 716,452

[22] Filed: Jun. 17, 1991

[30] Foreign Application Priority Data

Jun. 18, 1990 [JP] Japan .................. 2-159572

[51] Int. Cl.[5] .................. B60R 21/16
[52] U.S. Cl. .................. 280/728
[58] Field of Search .................. 280/732, 743, 728

[56] References Cited

U.S. PATENT DOCUMENTS

| | | | |
|---|---|---|---|
| 4,698,107 | 10/1987 | Goetz et al. | 280/728 X |
| 4,842,300 | 6/1989 | Ziomek et al. | 280/732 |
| 4,986,569 | 1/1991 | Bruton | 280/743 |
| 5,074,584 | 12/1991 | Jarboe | 280/732 X |

Primary Examiner—Tamara L. Graysay
Attorney, Agent, or Firm—Armstrong, Westerman, Hattori, McLeland & Naughton

[57] ABSTRACT

A retainer case accommodating an air bag and consisting of two separate parts, one being an open end side part terminating in an open end of the retainer case and the other being an inflator-secured end side part secured to the vehicle body, the open end side part and inflator-secured end side part being fitted together to form the retainer case. The open end side part of the retainer case is made less rigid than the inflator-secured end side part. When an impact is applied to the retainer case from the passenger compartment side, the open end side part undergoes a deformation and thus absorbs the impact. A stem of the air bag is secured to the retainer case with its edge clamped between the fitted portions of the open end side part and inflator-secured end side part of the retainer case.

6 Claims, 3 Drawing Sheets

VEHICLE OCCUPANT PROTECTION AIR BAG MODULE

BACKGROUND OF THE INVENTION

This invention relates to a vehicle occupant protection air bag module used for restraining a vehicle occupant in his or her seated position in the event of a collision and, more particularly, to an air bag module, in which a retainer case accommodating an air bag is mounted adjacent to a passenger compartment wall.

Air bag modules are recently used as a vehicle occupant protector for restricting a vehicle occupant's inertial forward movement at the time of a collision and thereby preventing secondary striking of the occupant against the front window glass, instrument panel, etc. In such air bag modules, an air bag is quickly inflated and deployed toward the vehicle occupant at the time of a collision by causing gas issued under high pressure from a gas generator to be introduced into it, thus receiving the occupant tending to be moved forwardly. The air bag has an open end portion secured to a retainer case, and normally it is accommodated in a compactly folded state in the retainer case.

The retainer is typically vessel-like and open at one end, and it is mounted on a steering wheel, an panel, etc. located ahead of the vehicle occupant such that the open end faces the passenger's compartment. This means that the retainer case is disposed adjacent to a passenger's compartment wall.

A gas generator or inflator is secured to the end of the retainer opposite the open end thereof, and a portion of the retainer case on the side, to which the inflator is secured, is supported by the vehicle body.

In this vehicle occupant protection air bag, the retainer case is a one-piece molding, such as shown in U.S. Pat. No. 4,842,300.

In such air bag module as above, a reaction force of issuance of gas under high pressure is applied to the inflator during inflation and deployment of the air bag. Therefore, the portion of the retainer case, to which the inflator is secured, should have a sufficiently high mechanical strength. Moreover, if the retainer case is deformed by the internal gas pressure, the air bag may fail to be deployed to a designated shape. Therefore, a portion of the retainer case which is subject to high pressure, i.e., a portion in the vicinity of the inflator, should have a sufficiently high rigidity.

In the meantime, it is prescribed by regulation that a passenger's compartment wall, for instance an instrument panel surface, be provided with a predetermined impact energy absorption performance. This means that the air bag module should be installed on the instrument panel without possibility of spoiling the impact energy absorption performance of the instrument panel. This means that a portion of the retainer case which is adjacent to the instrument panel surface can be readily deformed.

This means that an air bag module which is disposed adjacent to a passenger's compartment wall is required to have a retainer case of varied rigidity. With the prior art retainer which is formed as a one-piece molding, however, it is difficult to meet such a requirement for it is difficult to vary the rigidity partially.

Moreover, it is difficult to secure the stem of the air bag to a retainer case of the one-piece structure. More specifically, the retainer case and air bag are both open at one end, and therefore if it is intended to mount them face to face, their inside is not perfectly shielded from the outside. The mounting, therefore, has to be made in groping-about manner. Moreover, if the air bag stem is secured in several portions, cracks may be produced in the secured portions by the pressure of inflation of the air bag. Therefore, the stem has to be secured over the entire circumference. Usually, the air bag stem is retained by a plate or the like, and its entire circumference is supported by the retainer case. This requires such a plate or the like and also an operation of securing the plate or the like to the retainer case.

SUMMARY OF THE INVENTION

An object of the invention is to provide an air bag module, which can absorb impact energy while providing sufficient mechanical strength of the retainer case.

Another object of the invention is to provide an air bag apparatus, which permits ready mounting of the air bag to the retainer case.

In order to attain the above objects of the invention, a two-part retainer case is provided, which consists of an open end side part terminating in an open end and a secured end side part, to which an inflator is secured and which is supported by the vehicle body, these parts being coupled together into a single case.

The open end side part is less rigid than the end side part. In addition, an end portion of the inflator-secured end side part is fitted on the open end side part, and the stem of the air bag is secured by being clamped between the fitted portions.

With the retainer case constructed as a two-part case it is possible to make the rigidity of the open end side part low and make the ridigity of the inflator-secured end side part high. The retainer case thus can withstand gas pressure and has impact energy absorption performance.

Further, with the stem of the air bag adapted to be clamped between the open end side part and inflator-secured end side part, by merely fitting together these parts the entire perimeter of the air bag stem is clamped and secured in position between the fitted ends of these parts. Thus, the module has an extremely improved assembly.

BRIEF DESCRIPTION OF THE DRAWINGS

The above and other objects, construction and effects of the invention will become more apparent from the following description when the same is read with reference to the drawings, in which.

DESCRIPTION OF THE PREFERRED EMBODIMENTS

Figure 1:
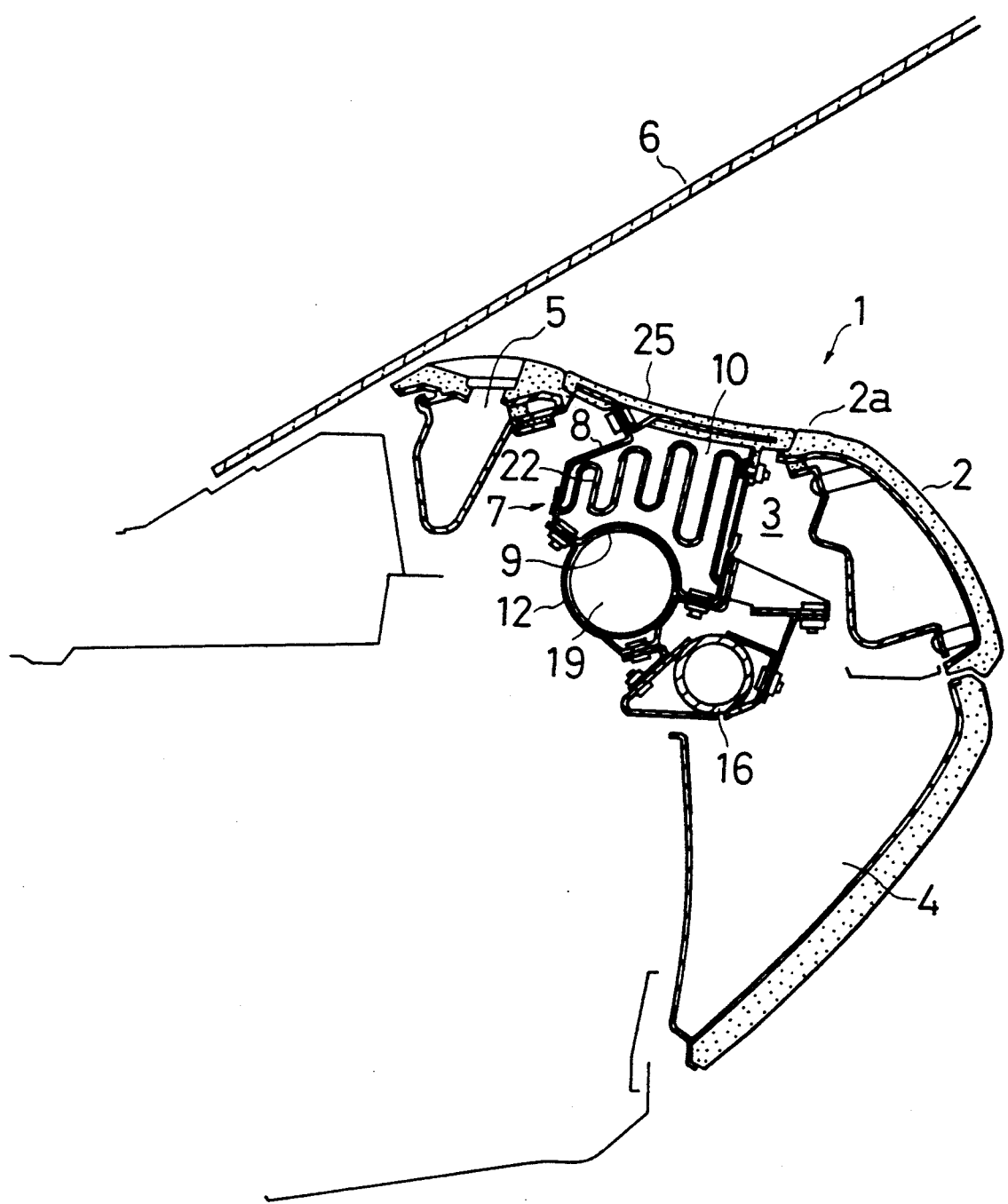
FIG. 1 is a sectional view showing a front compartment of a vehicle with an embodiment of the vehicle occupant protection air bag module according to the invention installed on the vehicle body.

Referring to FIG. 1, there is shown an air bag module 1, which is for the passenger seat and is installed in a cavity 3 formed in a central portion of the top surface 2a of a portion of an instrument panel 2 corresponding to the passenger seat. A glove box 4 is mounted below the air bag module 1. A defroster duct 5 is provided on the front side, i.e., left side in the Figure, of the air bag module 1. A front windshield glass 6 is located above the air bag module 1.

Figure 2:
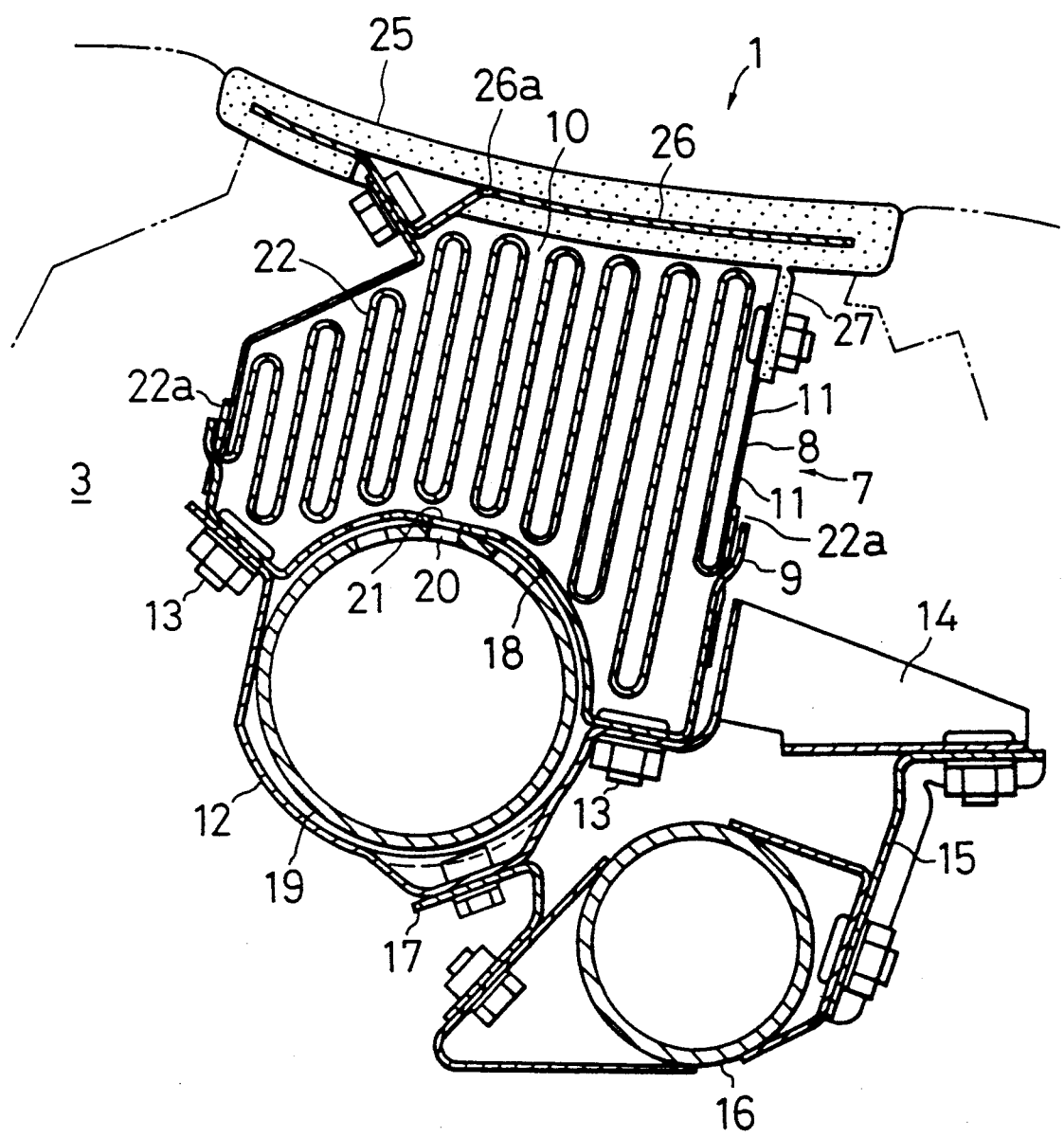
FIG. 2 is an enlarged-scale sectional view showing the same air bag module.
Figure 3:
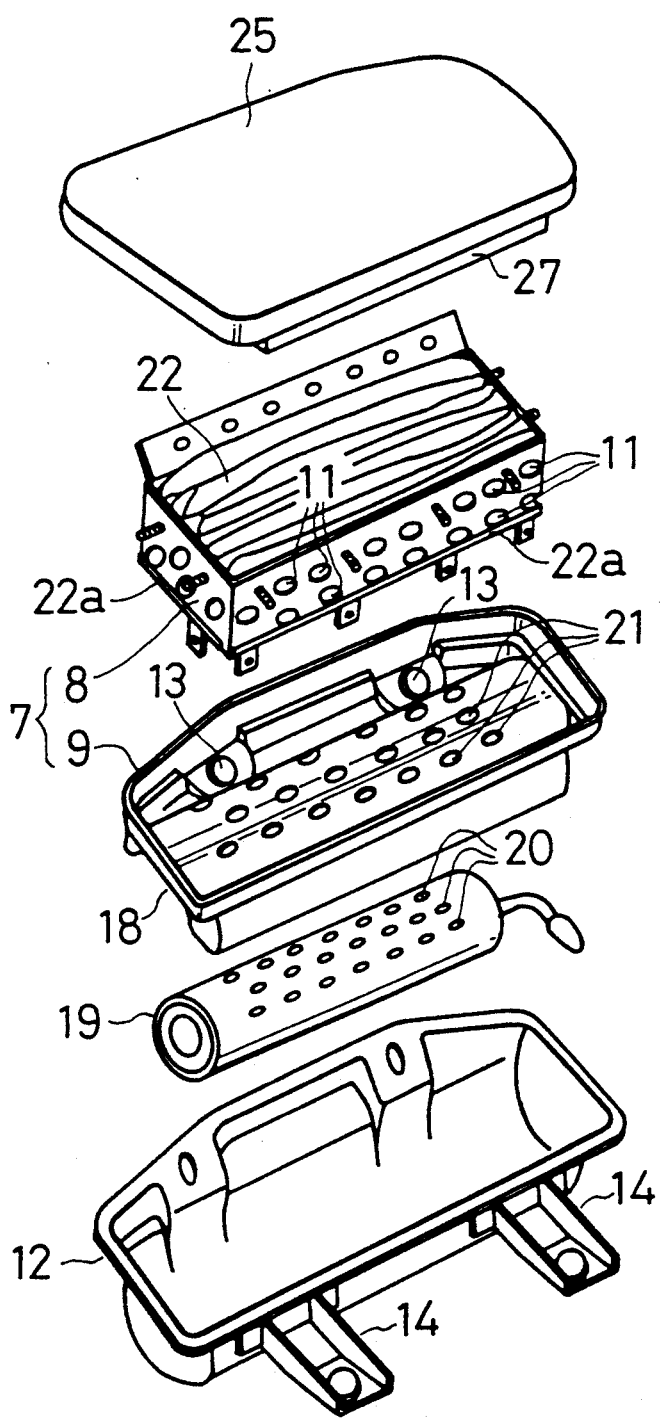
FIG. 3 is an exploded perspective view showing the same air bag module.

As shown in FIGS. 2 and 3, the air bag module 1 includes a vessel-like retainer case 7 which is open at the top. The retainer case 7 has a substantially rectangular horizontal sectional profile, and it consists of two separate parts, i.e., upper and lower parts 8 and 9. The upper part 8 terminates in a top opening 10 of the retainer case 7, and its lower end is fitted in the upper end of the lower part 9 and thus secured to the same. The upper part 8 is made from a steel plate which is thinner than that of the lower part 9. Further, its rear portion has a large number of holes 11 formed by stamping. Thus, of the retainer case 7 the upper part 8 has comparatively low rigidity, while the lower part 9 has comparatively high rigidity.

The lower part 9 of the retainer case 7 is fitted in a support cover 12 located below and secured to the same by screws 13. The support cover 12 has mounting stays 14 projecting rearwardly. The mounting stays 14 are secured by brackets 15 to an instrument panel reinforcement member 16. The support cover 12 is also supported from below by brackets 17 consisting of thin steel plates mounted on the reinforcing member 16. The reinforcing member 16 connects left and right front pillars. Thus, the lower part 9 of the retainer case 7 is firmly secured to the vehicle body, and it supports the upper part 8 terminating in the top opening 10. According to the invention, the upper part 8 is the open end side part, and the lower part 9 is the inflator-secured end side part.

The bottom of the lower part 9 of the retainer case 7 has a recessed portion 18 having a semi-circular sectional profile. When the support cover 12 is secured to the lower part 9, a space having a circular sectional profile is defined between these two parts. A cylindrical inflator 19 is accommodated in this space, and it is secured in position by being clamped vertically. The inflator 19 contains a sealed gas generation agent such as an explosive. It has the top of its outer periphery formed with a large number of gas outlet ports 20, as shown in FIG. 3. The bottom wall of the lower part 9 of the retainer case 7 has gas inlet ports 21 provided at positions corresponding to the respective gas outlet ports 20. When the gas generation agent in the inflator 19 is ignited, high pressure gas is issued through the gas outlet ports 20 to be introduced through the gas inlet ports 21 into the retainer cases 7.

Figure 4:
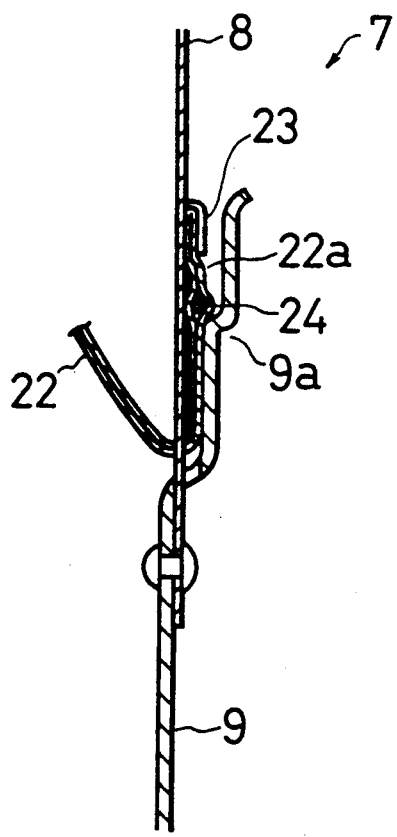
FIG. 4 is a fragmentary enlarged-scale sectional view showing part of the same air bag module.

An air bag 22 is accommodated in a folded state in the retainer case 7. The air bag 22 is like a sack made of a soft material and having an open stem portion. The edge 22a of the stem portion is folded back upwardly along the outer periphery of a lower end portion of the upper part 8 of the retainer case 7, as shown in FIG. 4, and it is retained in this state by a retaining member 23 provided on the upper part 8. The edge 22a of the stem portion of the air bag 22 thus is clamped between the lower end portion of the upper part 8 and upper end portion of the lower part 9 of the retainer case 7.

The edge 22a of the stem of the air bag 22 has a folded and sewed portion, through which an anchor rod 24 is inserted. The upper end portion of the lower part 9 of the retainer case 7 has a slightly flaring shoulder-like portion 9a. When the upper part 8, with the air bag 22 mounted thereon, of the retainer case 7 is fitted in the lower part 9, the anchor rod 24 engages with the shoulder-like portion 9a. In this way, the edge 22a of the stem of the air bag 22 is held in position without possibility of detachment.

The top opening 10 of the retainer case 7 is closed by a lid 25 which is flush with the top surface 2a of the instrument panel 2. The lid 25 is made of a soft resin and includes a buried core member 26. The core member 26 has a linear increased softness portion 26a which is found nearer the front edge and can be readily bent. The front edge of the core member 26 is secured to the upper end of the front wall of the retainer case 7. The rear edge of the lid 25 is coupled to the upper end of the retainer case 7 via a flange 27 having a reduced thickness portion capable of being readily broken apart.

The operation of the air bag module 1 for the passenger seat having the above construction will now be described.

Normally, the air bag 22 is accommodated in a folded state in the retainer case 7, and the top opening 10 thereof is closed by the lid 25. The instrument panel 2 thus is in its normal status.

A strong impact exerted to the top 2a of the instrument panel 2 in this state is absorbed by the impact energy absorption performance of the instrument panel 2 itself. An impact exerted to the lid 25, flush with the top surface 2a of the instrument panel 2, of the air bag module 1 is transmitted to the upper part 8 of the retainer case 7 located adjacent to the lid 25. The upper part 8 is made from a thin steel plate and is formed with a large number of holes 11, and hence its rigidity is low. Therefore, the impact causes deformation of the upper part 8, and impact energy is absorbed with this deformation.

The instrument panel 2 thus provides substantially normal impact energy absorption performance although the air bag module 1 is provided.

When the vehicle is suddenly decelerated due to a collision, this is detected by an acceleration sensor or the like, and as a result the gas generation agent in the inflator 19 is ignited. In consequence, combustion gas under high pressure is caused to issue through the gas outlet ports 20 of the inflator 19 to be introduced through the gas inlet ports 21 into the retainer case 7. The pressure of the introduced gas pushes up the air bag 22 against the lower surface of the lid 25, thus causing breakage of the reduced thickness portion of the flange 27 of the lid 25 and bending of the core member 26 in the increased softness portion 26a. The lid 25 thus is upwardly pushed open, that is, the top opening 10 of the retainer case 7 is opened, thus causing bulging of the air bag 22 out of the top 2a of the instrument panel 2 through the opening 10.

At this time, a high gas pressure is applied to the lower part 9 of the retainer case 7. However, the lower part 9 is not deformed by this pressure for it is made from a thick steel plate and is sufficiently rigid. Also at this time a high reaction force accompanying the issuing of the high pressure gas is applied to the inflator 19, but the inflator 19 is reliably supported for it is secured to the reinforcement member 16 of the vehicle body via the support cover 12.

The air bag 22 bulging from the top surface 2a of the instrument panel 2 is inflated upwardly by the upwardly issuing gas and eventually brought into contact with the front window glass 6 and guided by the same for deployment toward the rearward vehicle occupant. At this time, the inner gas pressure applies to the air bag 22 a force tending to cause the air bag 22 to leave the retainer case 7. To this end, a pulling force is applied to the secured stem portion of the air bag 22. However, since the edge 22a of the stem is clamped between the upper and lower parts 8 and 9 of the retainer case 22 and the anchor rod 24 provided on the edge 22a of the stem is in engagement with the shoulder-like portion 9a of the lower part 9, the pulling force is dispersed along the entire perimeter of the edge of the stem of the air bag 22. Thus, the secured stem portion of the air bag 22 is never broken, and the air bag 22 is reliably retained.

Further, since the stem opening of the air bag 22 is found in the vicinity of the inflator 19, the gas issuing from the inflator 19 is efficiently introduced into the air bag 22. Besides, since the stem opening of the air bag 22 is surrounded by the highly rigid lower part 9 of the retainer base 7, its shape can be maintained as designed. The air bag 22 thus can be inflated for deployment into a predetermined shape.

When assembling the air bag module 1, the air bag 22 is folded and accommodated in the upper part 8 of the retainer case 7, and its stem edge 22a is retained by the retaining member 23. Then, the lid 25 is secured to the top of the upper part 8. Then, the lower end of the upper part 8 is fitted in the lower part 9, and these parts are secured to each other with screws. Consequently, the stem edge 22a of the air bag 22 is clamped between the upper and lower parts 8 and 9, and the anchor rod 24 provided on the stem edge member 22a is engaged with the shoulder 9a of the lower part 9.

Thereafter, the inflator 19 is disposed in along the bottom of the retainer case 7 which is assembled in the above way. Then, the support cover 12 is fitted on the retainer case 7 from below the inflator 19, and the retainer case 7 and support cover 12 are secured to each other with screws 13. The inflator 19 thus is firmly secured to the retainer case 7.

In the above way, the air bag module 1 is completed. The air bag module 1 is then inserted into the cavity 3 from above the instrument panel 2. Then, the glove box 4 is opened, and the support cover 12 is screwed to the brackets 15 and 17 by inserting a hand upwardly into the glove box 4. In this way, the air bag module 1 is secured to the reinforcement member 16 of the vehicle body.

As shown above, with the present air bag module 1 the stem edge 22a of the air bag 22 can be very readily secured, that is, the air bag module 1 can be very readily assembled.

In the above embodiment, the upper part 8 of the retainer case 7 is made to be less rigid by making it from a thin steel plate and providing it with a large number of stamped holes 11. Alternatively, it is possible to use resins or like low rigidity materials for the upper part or provide the upper part with corrugated wall surfaces with be readily deformed.

Further, while the above description has discussed the air bag module 1 installed inside the top surface 2a of the instrument panel 2 in correspondence to the passenger seat, this is by no means limitative, and the invention is applicable as well to an air bag module installed on the rear surface of the instrument panel 2 or on a door inner surface.

As has been described in the foregoing, according to the invention the retainer case consists of two parts, i.e., open end side part and inflator-secured end side part, the former part being made less rigid than the latter. Thus, a portion of the module adjacent to the vehicle compartment wall can be imparted with an impact energy absorption performance while permitting the retainer case and inflator to be supported reliably. The air bag module thus can be installed on the instrument panel top and so forth and has excellent performance for restraining a vehicle occupant.

Further, since the air bag stem portion is supported by clamping between the open end side part and inflator-secured end side part of the retainer case, its entire perimeter can be securedly supported without use of any separate plate or like member. Thus, the assembling of the air bag module can be facilitated, and stable deployment performance of the air bag module can be ensured.

What is claimed is:

1. An air bag module comprising:
   a retainer case installed on a vehicle body such that an open end faces a passenger compartment;
   an air bag having a stem secured to and supported by said retainer case and accommodated in a folded state therein; and
   an inflator provided at an end of said retainer case opposite said open end serving to issue gas into said air bag to cause inflation and deployment of said air bag;
   said retainer case including two separate parts, one being an open end side part terminating in said open end and the other being an inflator-secured end side part with said inflator secured thereto, said inflator-secured end side part being supported by said vehicle body, said open end side part being made to be less rigid than said inflator-secured end side part, wherein said open end side part of said retainer case is thinner than said inflator-secured end side part, and is thereby less rigid than said inflator-secured end side part.

2. The air bag module according to claim 1, wherein said open end side part of said retainer case is formed with stamped holes and thereby made less rigid.

3. The air bag module according to claim 1, wherein said retainer case is installed on an instrument panel such that its open end faces the top surface of said instrument panel.

4. An air bag module comprising:
   a retainer case installed on a vehicle body such that an opening end faces a passenger compartment;
   an air bag having a stem secured to and supported by said retainer case and accommodated in a folded state therein; and
   an inflator provided at an end of said retainer case opposite said open end serving to issue gas into said air bag to cause inflation and deployment of said air bag;
   said retainer case consisting of two separate parts, one being an open end side part terminating in said open end and the other being an inflator-secured end side part with said inflator being secured thereto, said inflator-secured end side part being supported by said vehicle body and having an end portion fitted on said open end side part, said air bag stem being clamped and supported between said open end side part and inflator-secured end side part.

5. The air bag module according to claim 4, wherein an end portion of said open end side part of said retainer case is fitted in said end portion of said inflator-secured end side part, said end portion of said inflator-secured end side part having a shoulder engaging with an engaging portion protruding from an outer periphery of said stem of said air bag and thereby preventing detachment of said stem.

6. The air bag module according to claim 5, wherein said open end side part of said retainer case is provided with a retaining member for retaining an edge of said stem of said air bag.

* * * * *